United States Patent
Zhou et al.

(10) Patent No.: US 10,172,092 B1
(45) Date of Patent: Jan. 1, 2019

(54) SYSTEMS AND METHODS FOR PROVIDING A SLEEP CLOCK ON A WIRELESS COMMUNICATIONS DEVICE

(71) Applicant: Marvell International Ltd., Hamilton (BM)

(72) Inventors: Xuan Zhou, Fremont, CA (US); Bin Xia, Shanghai (CN); Shiyi Zhu, Shanghai (CN); Xiaohu Chen, Shanghai (CN); Xioabo Zhang, Shanghai (CN); Qingming Zhang, Shanghai (CN)

(73) Assignee: Marvell International Ltd., Hamilton (BM)

( * ) Notice: Subject to any disclaimer, the term of this patent is extended or adjusted under 35 U.S.C. 154(b) by 104 days.

(21) Appl. No.: 15/193,459

(22) Filed: Jun. 27, 2016

Related U.S. Application Data (60) Provisional application No. 62/196,436, filed on Jul. 24, 2015.

(51) Int. Cl.
| | |
|---|---|
| *H04W 52/02* | (2009.01) |
| *H04L 7/033* | (2006.01) |
| *H04L 7/00* | (2006.01) |

(52) U.S. Cl.
CPC ....... *H04W 52/0283* (2013.01); *H04L 7/0016* (2013.01); *H04L 7/0331* (2013.01); *H04W 52/0293* (2013.01)

(58) Field of Classification Search
CPC .......... H04W 52/0283; H04W 52/029; H04W 52/0216; H04W 52/0293; H04W 52/0287; H04L 7/0016; H04L 7/0331
See application file for complete search history.

(56) References Cited

U.S. PATENT DOCUMENTS

| | | | |
|---|---|---|---|
| 6,735,454 B1 * | 5/2004 | Yu .................... | H04W 52/0293 455/343.1 |
| 2007/0165594 A1 * | 7/2007 | Heinle .................... | H03L 7/00 370/350 |

* cited by examiner

*Primary Examiner* — Kabir A Timory (57) ABSTRACT

Example systems and methods are provided for maintaining a system clock during a sleep mode of a mobile communication device. An example system may include a high frequency clock circuit configured to generate a system clock, and a low frequency clock circuit configured to generate a sleep clock, where the sleep clock has a lower frequency than the system clock. The example system may further include a sleep system configured to deactivate the system clock in response to the mobile communication device entering sleep mode. The sleep system may include a sleep counter configured to use the sleep clock to maintain a sleep count for the deactivated system clock during the sleep mode, and a calibration unit configured to activate a calibration clock at periodic intervals during the sleep mode and utilize the calibration clock to calibrate a frequency of the sleep clock.

14 Claims, 6 Drawing Sheets

SYSTEMS AND METHODS FOR PROVIDING A SLEEP CLOCK ON A WIRELESS COMMUNICATIONS DEVICE

CROSS-REFERENCE TO RELATED APPLICATIONS

This disclosure claims priority to and benefit from U.S. Provisional Patent Application No. 62/196,436, filed on Jul. 24, 2015, the entirety of which is incorporated herein by reference.

FIELD

The technology described in this patent document relates generally to wireless communication systems and more particularly to systems and methods for providing a sleep clock on a wireless communication device.

BACKGROUND

In a wireless communication system, the battery capacity of a wireless communication device is limited as a result of device size. In order to conserve power, wireless communication devices often utilize discontinuous reception (DRX) techniques that allow the devices to power down certain circuitry when operating in an idle mode, commonly referred to as "sleep mode." During DRX sleep mode, a wireless communication device typically disables a fast system clock and utilizes a lower-frequency clock for sleep counting. When the wireless communication device exits sleep mode, the fast system clock is restored using the sleep count.

The lower-frequency sleep clock in a wireless communication device is typically a 32 kHz clock source, provided by an external crystal oscillator. A crystal oscillator advantageously provides a relatively stable clock source, but may increase the cost and size of the integrated circuit.

SUMMARY

Example systems and methods are provided for maintaining a system clock during a sleep mode of a mobile communication device. An example system may include a high frequency clock circuit configured to generate a system clock, and a low frequency clock circuit configured to generate a sleep clock, where the sleep clock has a lower frequency than the system clock. The example system may further include a sleep system configured to deactivate the system clock in response to the mobile communication device entering sleep mode. The sleep system may include a sleep counter configured to use the sleep clock to maintain a sleep count for the deactivated system clock during the sleep mode, and a calibration unit configured to activate a calibration clock at periodic intervals during the sleep mode and utilize the calibration clock to calibrate a frequency of the sleep clock, where the calibration clock has a higher frequency than the sleep clock. The sleep system may be further configured to utilize the sleep count to determine a restoration value for the system clock in response to the mobile communication device exiting the sleep mode. In embodiments, the low frequency clock circuit may be a clock unit in a power management integrated circuit.

DETAILED DESCRIPTION

Figure 1:
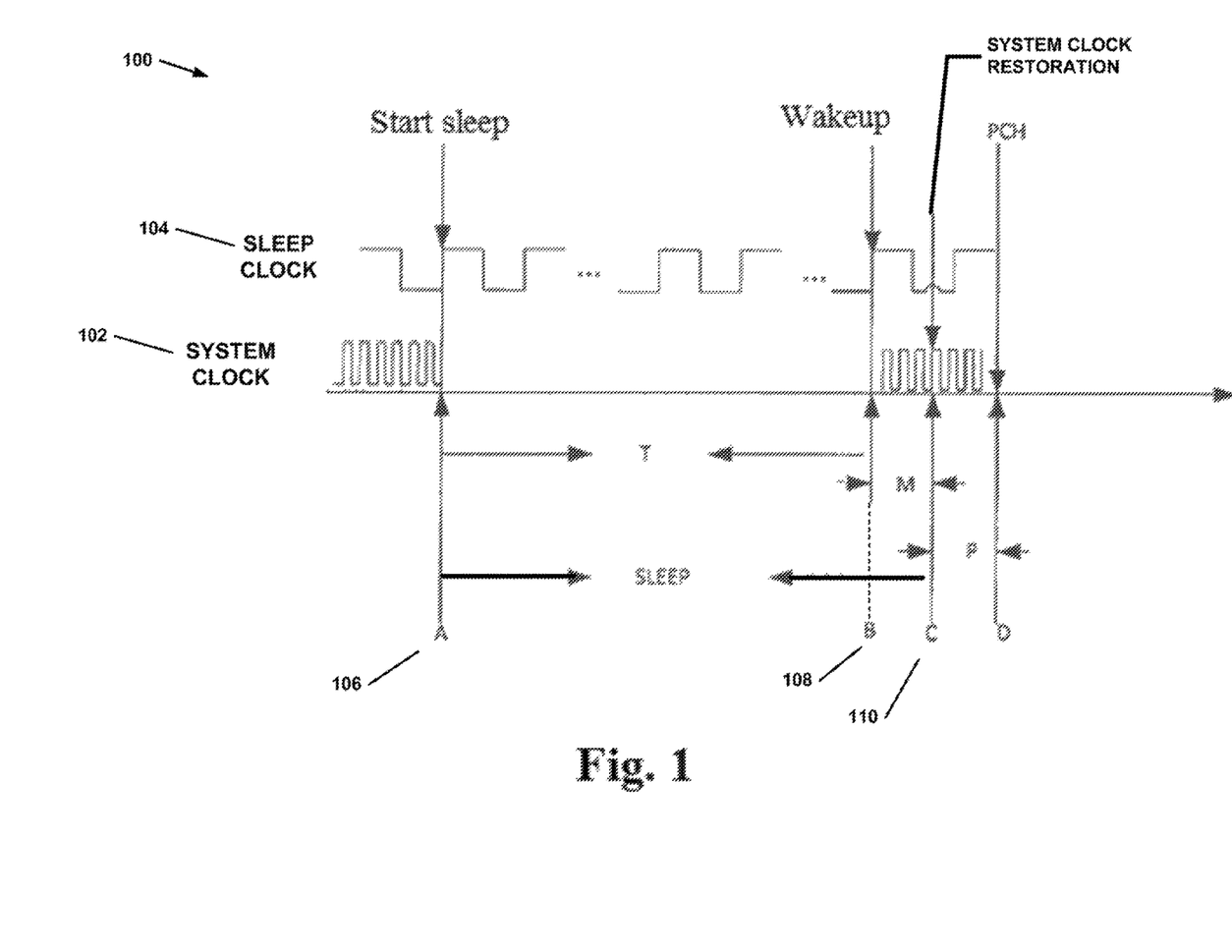
FIG. 1 depicts an example timing diagram for a process of disabling a high frequency system clock in a mobile communication device during an idle or "sleep" mode of the device.

FIG. 1 depicts an example timing diagram 100 for a process of disabling a high frequency system clock 102 in a mobile communication device during an idle or "sleep" mode of the device. The sleep mode process illustrated in FIG. 1 may, for example, be used in a mobile communication device during a discontinuous reception (DRX) mode. During sleep mode the mobile communication device maintains a sleep count using a lower frequency (e.g., 32 kHZ) sleep clock 104. After exiting sleep mode, the sleep count is used to restore the higher frequency system clock 102 to its proper value.

In the example illustrated in FIG. 1, the mobile communication device enters sleep mode at point A (106) on the timing diagram. Upon entering sleep mode at point A (106), the value ($BC_A$) of the high frequency system clock 102 is recorded, and the system clock 102 is disabled. Once the system clock 102 is disabled at point A (106), the lower frequency sleep clock 104 is used to maintain a count during the sleep period. In the illustrated example, a wakeup signal is received at point B (108) on the timing diagram 100, which causes the system clock 102 to be reactivated. The sleep count (SLEEP) is then used to calculate a restoration value ($BC_C$) for the system clock 102, which is restored at point C (110) in the illustrated timing diagram 100. Once the high frequency system clock 102 is restored, the mobile communication device may resume normal receiving operations. The high frequency system clock value ($BC_C$) at point C is restored as a function of the recorded value ($BC_A$) of the system clock 102 at point A and the sleep count (SLEEP):

$$BC_C = BC_A + \text{SLEEP}$$

The accuracy of the restored system clock value ($BC_C$) directly affects the subsequent receiving time window for the mobile communication device (e.g., starting at point D in the example timing diagram.) The sleep count (SLEEP) that is used to calculate the restored system clock value ($BC_C$) is calculated as:

$$\text{SLEEP} = T + M$$

The sleep mode may preferably be initiated on a rising edge of the sleep clock 104, as illustrated in the example shown in FIG. 1. In this way, the value of T may be calculated as a function of the number of sleep clock periods occurring from point A to point B in the timing diagram 100 and the frequency (e.g., 35 kHz) of the sleep clock 104. The wakeup period (M) between points B and C in the timing diagram 100 is a fixed value. The sleep count (SLEEP) may therefore be represented as:

$$SLEEP = T + M = N \times \frac{1}{f} + M,$$

where f is the frequency of the sleep clock 104 and N is the number of sleep clock periods during the time period T. The frequency (f) of the sleep clock 104 may, for example, be obtained before entering sleep mode.

Figure 2:
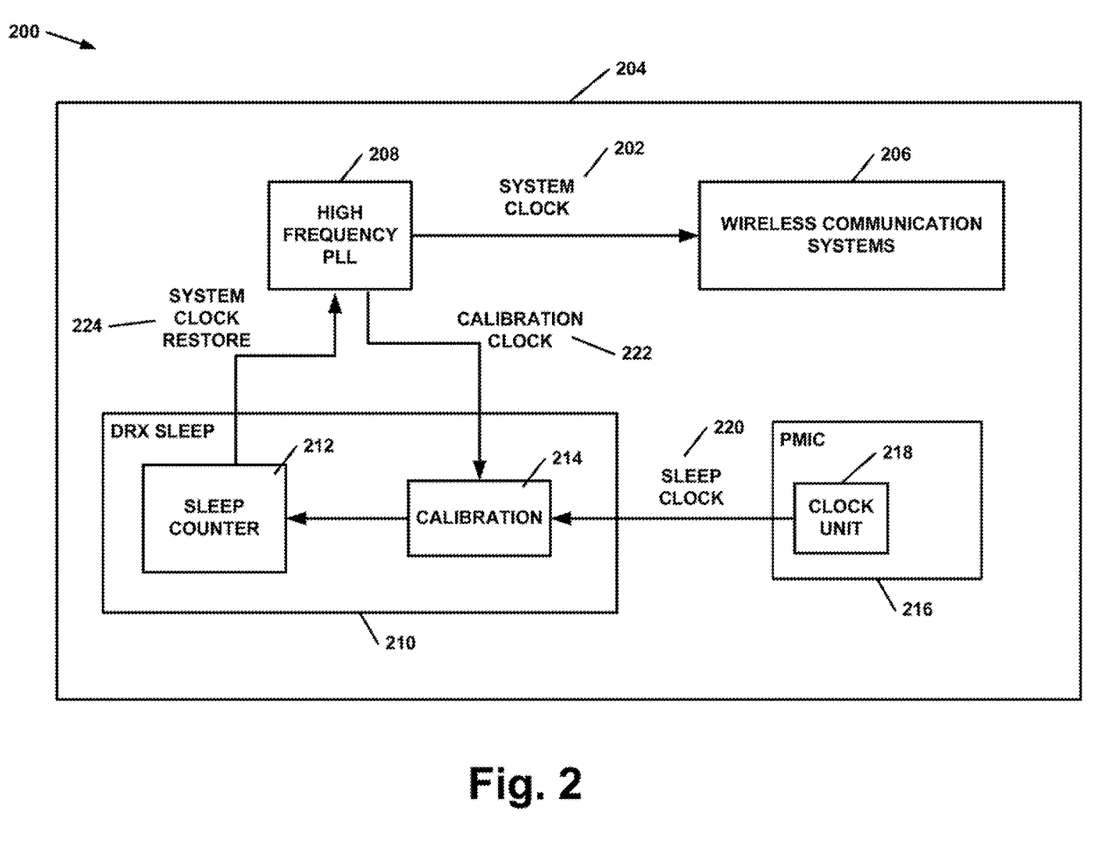
FIG. 2 is a block diagram illustrating an example system for disabling a high frequency system clock during sleep mode of a mobile communication device.

FIG. 2 is a block diagram illustrating an example system 200 for disabling a high frequency system clock 202 during sleep mode of a mobile communication device 204. The example system 200 includes a wireless communications system 206 that receives the high frequency system clock 202 from a clock circuit 208, such as a high frequency phase locked loop (PLL). The system 200 further includes a DRX sleep system 210 having a sleep counter 212 and calibration unit 214, and a power management integrated circuit (PMIC) 216 having a clock unit 218. The sleep counter 212 and calibration unit 214 in the DRX sleep system 210 may, for example, be implemented using software that is stored on a computer readable medium and executed by one or more processors, using application specific integrated circuitry or other suitable hardware devices, or using a combination of hardware and software. In operation, the clock unit 218 in the PMIC 216 provides a low frequency (e.g., 32 kHz) sleep clock 220 that is used by the sleep counter 212 in the DRX sleep system 210 to maintain a sleep count during a DRX sleep mode of the mobile communication device 204. The sleep count may be used by the DRX sleep system 210 to calculate a restoration value 224 for the system clock 202, for example as described above with reference to the timing diagram 100 shown in FIG. 1.

Use of the PMIC clock unit 218 to provide the sleep clock 220 reduces the size and cost of the system 200 by eliminating the need for an external crystal oscillator. Because the PMIC 216 is also used to supply power to systems throughout the mobile communication device 200, the size and cost of the PMIC 216 is already accounted for in the overall system design. The use of the PMIC clock unit 218, instead of an external crystal oscillator, to supply the sleep clock 220 may therefore provide a significant design advantage. However, the low frequency (e.g., 32 kHz) clock unit 218 in a PMIC 216 is typically an RC circuit that does not provide the accuracy of an external crystal oscillator. That is, the frequency drift of a low frequency (e.g., 32 kHz) clock source implemented using the RC circuit in a PMIC is typically larger than the frequency drift of a low frequency clock source provided by an external crystal oscillator, with the frequency drift from the RC clock source being largely affected by environmental factors, such as temperature. As a result, the use of the sleep clock 220 from the PMIC clock unit 218 creates a possibility that there will be a frequency drift over the duration of the sleep period (T) that needs to be taken into consideration when calculating the sleep count (SLEEP). Otherwise, if there is a derivation in the sleep count (SLEEP) that is unaccounted for, the restored high frequency system clock value may not be accurate. The adjusted sleep count (SLEEP'), which accounts for the actual frequency (f') of the sleep clock 220 during the sleep period (T), may be expressed as:

$$SLEEP' = T' + M = N \times \frac{1}{f'} + M,$$

In order to determine the adjusted sleep count (SLEEP'), the frequency (f') of the sleep clock 220 during the sleep period (T) needs to be known. The DRX sleep system 210, as depicted in FIG. 2, therefore utilizes the calibration unit 214 to calibrate the frequency of the sleep clock 220 using an accurate high frequency calibration clock 222 signal that is generated by the high frequency clock circuit 208. Examples of sleep clock calibration procedures that may be employed by the DRX sleep system 210 are detailed below with reference to FIGS. 3-6.

Figure 3:
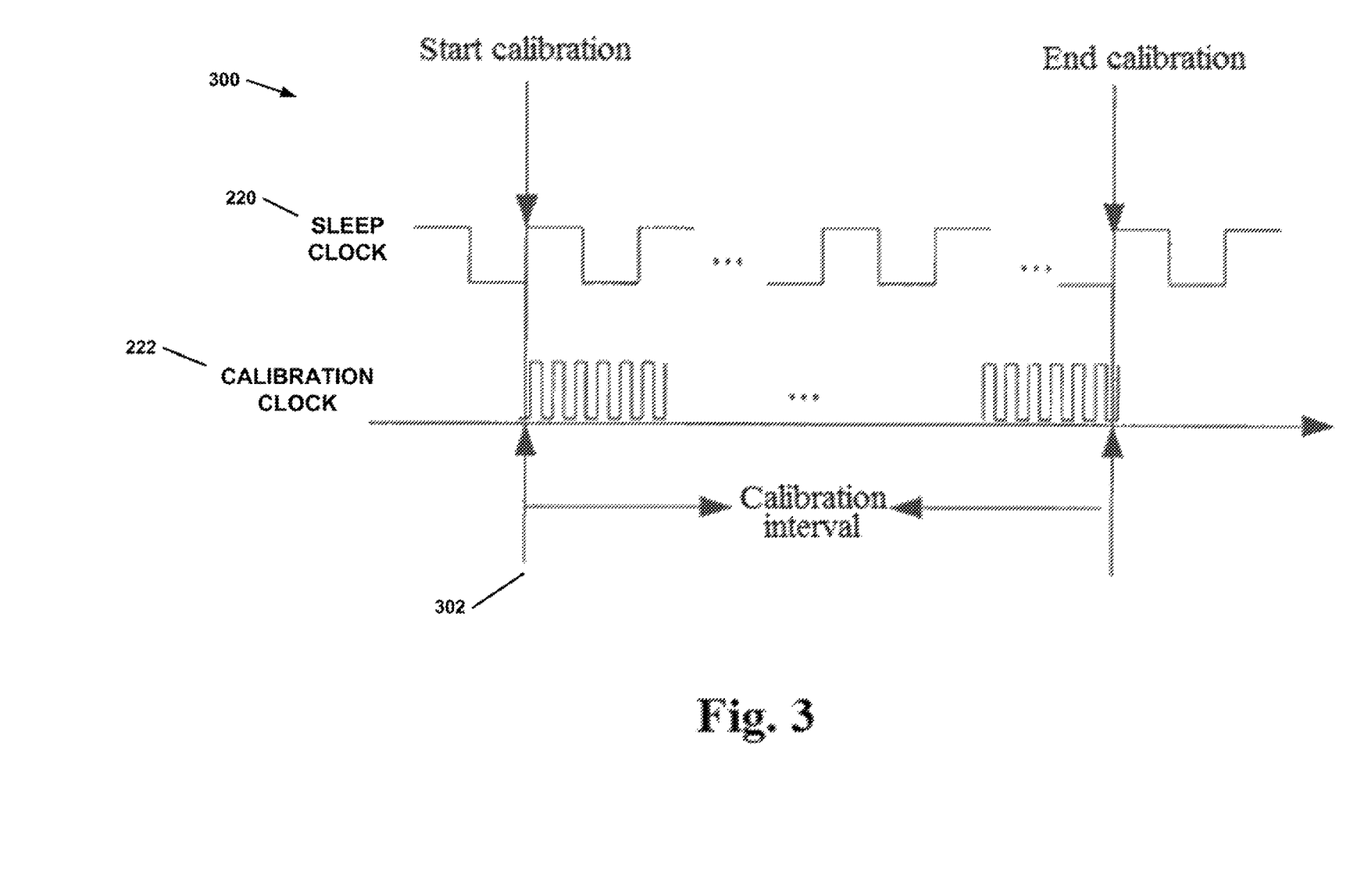
FIG. 3 depicts an example timing diagram for a process of calibrating a sleep clock in a mobile communication device.
Figure 4:
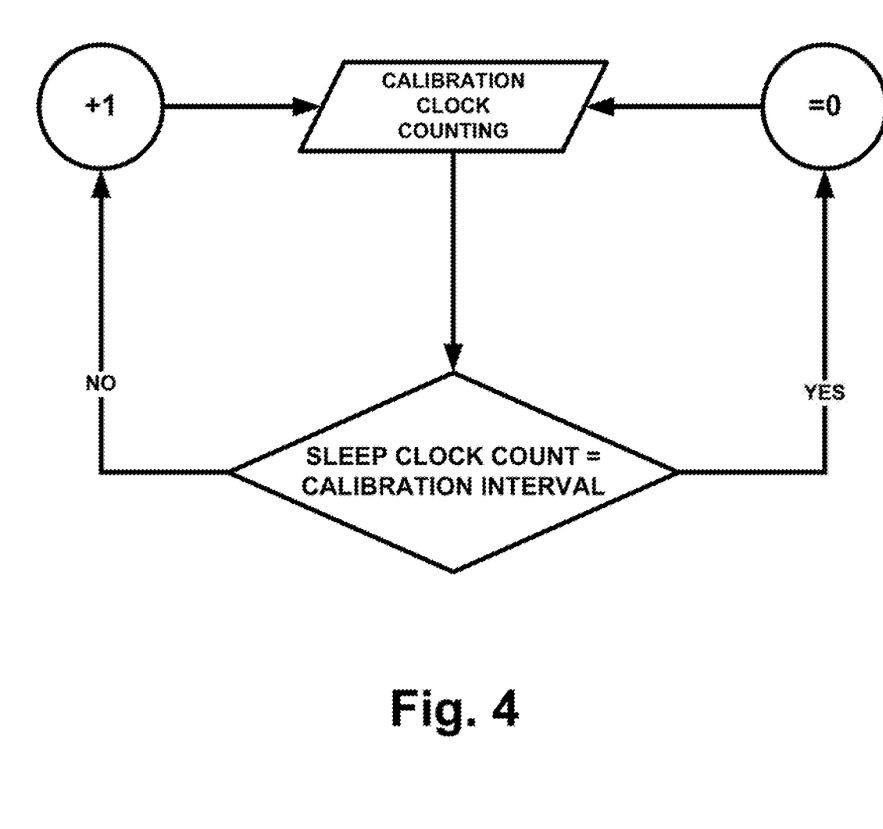
FIG. 4 is a flow diagram depicting an example method for calibrating a sleep clock in a mobile communication device.

With reference first to the timing diagram 300 illustrated in FIG. 3, a sleep clock calibration procedure may be triggered during a sleep period (T) of the mobile communication device. When calibration is initiated, at point 302 in FIG. 3, the calibration clock 222 is latched in a rising edge of the sleep clock 220, and the calibration clock 222 starts counting. Over the duration of the calibration interval (starting from point 302), the sleep clock 220 is configured with n sleep clock counters before the calibration clock 222 stops counting and is closed. Over the period of the calibration interval, m periods of the calibration clock are generated. The frequency (f') of the sleep clock 220 obtained through calibration may therefore be expressed as:

$$f' = \frac{1}{\left(m \times \frac{1}{F}\right)/n},$$

where F is the frequency of the calibration clock 222. An implementation of the above calibration equation is illustrated in FIG. 4. As shown in FIG. 4, calibration clock 222 counting continues until the value of the sleep clock count reaches the preselected calibration interval.

With reference again to FIG. 2, the calibration clock 222 may be generated with a known frequency (F) by the high frequency clock circuit 208 that generates the system clock 202. In this way, the calibration clock 222 may be generated with an accurate frequency that is as high as possible. The calibration clock 222 should be generated with a high frequency because the sleep clock 220 and the calibration clock 222 belong to different clock domains, and the calibration method may have a maximum of ±2 calibration clock counting indeterminacies. That is, the counter may add 1 or not add 1 depending on whether the rising edge of the calibration clock is before or after the rising edge of the sleep clock. The enabling/disabling time for the calibration clock 222 will therefore have a ±1 calibration clock period indeterminacy. Thus a higher frequency calibration clock 222 will result in a smaller timing error.

Figure 5:
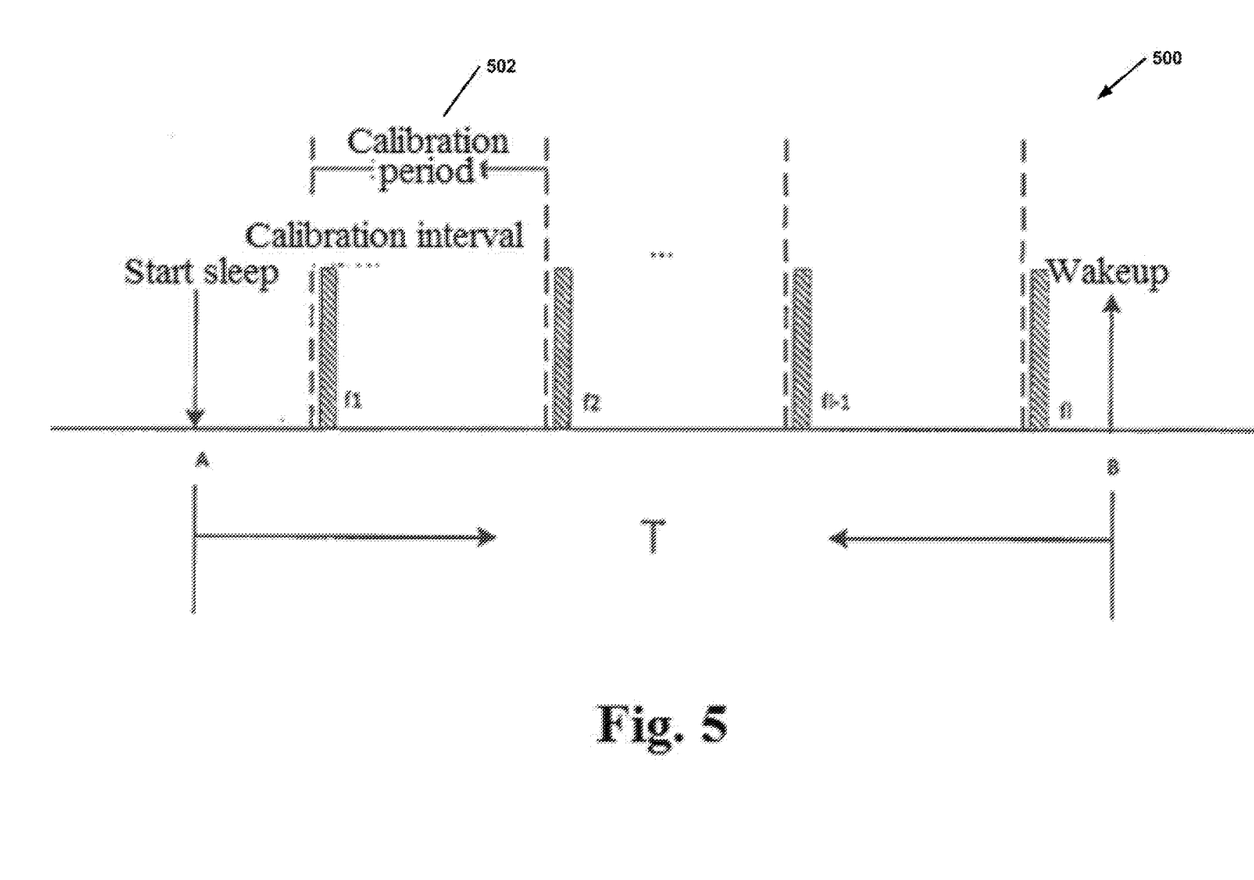
FIG. 5 depicts an example timing diagram for a process of calibrating a sleep clock at multiple calibration intervals.

As illustrated by the timing diagram 500 shown in FIG. 5, the DRX sleep system may perform multiple calibrations during a single sleep period (T). In the example illustrated in FIG. 5, the calibration period 502 is the period of multiple calibrations during the entire sleep period (T). The calibrated sleep clock frequencies obtained during each calibration period 502 are respectively $f_1, f_2, \ldots, f_{l-1}, f_l$, where l is the number of calibration periods 502. Because the change of clock frequency due to multiple calibrations is similar to Gaussian noise during the sleep period (T), the frequency (f') of the sleep clock 220 obtained through multiple calibrations during the sleep period (T) may be expressed as:

$$\frac{1}{f'} = \frac{\frac{1}{f_1} + \frac{1}{f_2} + \ldots + \frac{1}{f_l}}{l}$$

-continued $$\text{then } T' = \frac{\frac{1}{f_1} + \frac{1}{f_2} + \ldots + \frac{1}{f_l}}{l} \times N_{total}$$

Figure 6:
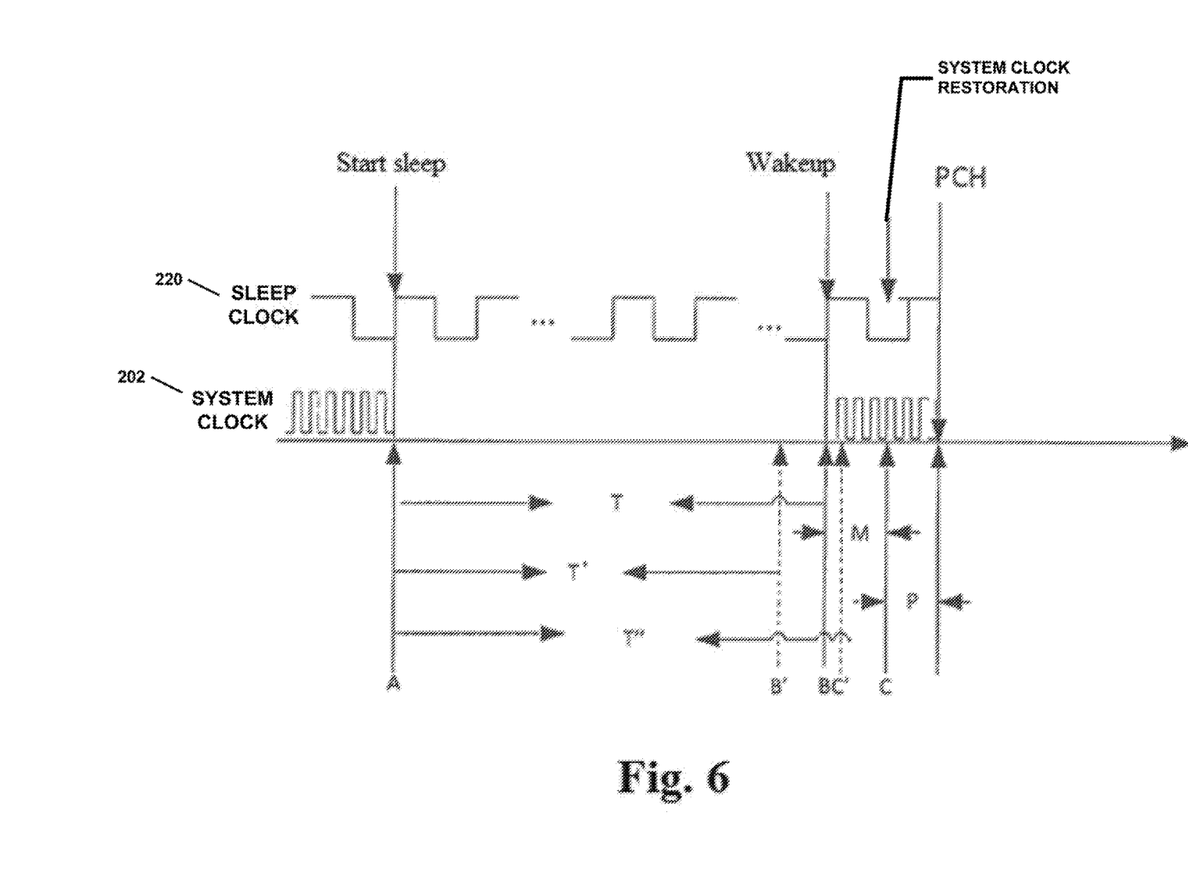
FIG. 6 depicts an example timing diagram that illustrates the effect of multiple sleep clock calibrations on the process depicted in FIG. 1.

As demonstrated by the equations above, multiple calibrations may affect the duration of the sleep period (T). As shown in FIG. 6, the change in sleep period (T) from multiple calibrations (shown as T') may result in a corresponding change in the system clock 202 wakeup point (B), shown as point B' in FIG. 6. Because the wakeup period (M) is fixed, the system clock 202 restoration point (C) may also change to point C', as shown in FIG. 6. The restored system clock 202 value ($BC_{C'}$) at point C' should therefore be recalculated, as follows, if multiple calibration intervals are utilized by the DRX sleep system:

$$BC_{C'} = BC_C - (T - T')$$

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:

1. A method for maintaining a system clock during a sleep mode of a mobile communication device, the method comprising:
    entering the sleep mode by the mobile communication device;
    in response to entering the sleep mode,
    deactivating the system clock, and
    maintaining a sleep count for the deactivated system clock using a sleep clock, the sleep clock having a lower frequency than the system clock, wherein the sleep count is a number of sleep clock cycles that the mobile communication device is in the sleep mode; and
    at periodic intervals throughout the sleep mode,
    (a) activating a calibration clock, the calibration clock having a higher frequency than the sleep clock,
    (b) using the calibration clock to calibrate a frequency of the sleep clock, and
    (c) deactivating the calibration clock.

2. The method of claim 1, further comprising:
    exiting the sleep mode; and
    in response to exiting the sleep mode, using the sleep count to determine a restoration value for setting the system clock.

3. The method of claim 2, further comprising:
    recording a value of the system clock in response to entering the sleep mode,
    wherein the restoration value for the system clock is determined as a function of the recorded system clock value and the sleep count.

4. The method of claim 1, wherein the sleep clock is provided by a clock unit in a power management integrated circuit.

5. The method of claim 1, wherein a calibrated frequency (f') of the sleep clock is determined according to an equation:

$$f' = \frac{1}{\left(\frac{mx^1}{F}\right)}.$$

where m is a number of periods of the calibration clock during a calibration interval, F is the frequency of the calibration clock, and n is a number of sleep clock counters.

6. The method of claim 1, wherein the calibration clock and system clock are both generated by a high frequency clock circuit.

7. A clock system for a mobile communication device, the clock system comprising:
    a high frequency clock circuit configured to generate a system clock;
    a low frequency clock circuit configured to generate a sleep clock, the sleep clock having a lower frequency than the system clock; and
    a sleep system stored on a computer readable medium and executed by one or more processors, the sleep system when executed being configured to deactivate the system clock in response to the mobile communication device entering a sleep mode, the sleep system including
    a sleep counter configured to use the sleep clock to maintain a sleep count for the deactivated system clock during the sleep mode, wherein the sleep count is a number of sleep clock cycles that the mobile communication device is in the sleep mode, and
    a calibration unit configured to, at periodic intervals throughout the sleep mode, (a) activate a calibration clock, (b) utilize the calibration clock to calibrate a frequency of the sleep clock, and (c) deactivate the calibration clock,
    wherein the calibration clock has a higher frequency than the sleep clock.

8. The clock system of claim 7, wherein the sleep system is further configured to utilize the sleep count to determine a restoration value for setting the system clock in response to the mobile communication device exiting the sleep mode.

9. The clock system of claim 8, wherein the sleep system is further configured to record a value of the system clock in response to entering the sleep mode, and wherein the restoration value for the system clock is determined as a function of the recorded system clock value and the sleep count.

10. The clock system of claim 7, wherein the low frequency clock circuit is a clock unit in a power management integrated circuit.

11. The clock system of claim 7, wherein the calibration clock is generated by the high frequency clock circuit.

12. The clock system of claim 11, wherein the high frequency clock circuit is a phase locked loop circuit.

13. The clock system of claim 7, wherein the sleep clock is a 32 kHZ clock signal.

14. The clock system of claim 7, wherein a calibrated frequency (f') of the sleep clock is determined according to an equation:

$$f' = \frac{1}{\frac{\left(\frac{mx^1}{F}\right)}{n}},$$

where m is a number of periods of the calibration clock during a calibration interval, F is the frequency of the calibration clock, and n is a number of sleep clock counters.

* * * * *